United States Patent
Ma et al.

(10) Patent No.: US 6,580,925 B2
(45) Date of Patent: *Jun. 17, 2003

(54) ARRANGEMENT RELATING TO TELECOMMUNICATION

(75) Inventors: Ming Ma, Kuala Lumpur (MY); Anders Bränneby, Järfälla (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,842

(22) Filed: Dec. 28, 1999

(65) Prior Publication Data

US 2003/0083096 A1 May 1, 2003

(30) Foreign Application Priority Data

Dec. 29, 1998 (SE) .............................................. 9804591

(51) Int. Cl.⁷ .............................. H04B 1/38; H04M 1/00
(52) U.S. Cl. ...................... 455/560; 455/561; 455/507; 455/517; 370/310; 370/310.2; 370/328
(58) Field of Search ................................. 455/439, 550, 455/560, 561, 426, 414, 507, 517, 524; 370/339

(56) References Cited

U.S. PATENT DOCUMENTS

| | | | | |
|---|---|---|---|---|
| 4,887,265 A | * | 12/1989 | Felix ........................ | 370/94.1 |
| 5,434,854 A | * | 7/1995 | Focarile et al. ............ | 370/60.1 |
| 5,579,306 A | * | 11/1996 | Dent ........................ | 370/330 |
| 5,583,913 A | * | 12/1996 | Taketsugu .................. | 379/58 |
| 5,590,133 A | * | 12/1996 | Billstrom et al. ........... | 370/349 |
| 5,802,483 A | * | 9/1998 | Morris ...................... | 455/557 |
| 5,887,256 A | * | 3/1999 | Lu et al. ................... | 455/426 |
| 5,896,369 A | * | 4/1999 | Warsta et al. ............... | 370/338 |
| 5,901,142 A | * | 5/1999 | Averbuch et al. ........... | 370/329 |
| 5,901,352 A | * | 5/1999 | St-Pierre et al. ........... | 455/426 |
| 5,950,134 A | * | 9/1999 | Agrawal et al. ............. | 455/439 |
| 6,072,789 A | * | 6/2000 | Lambertsson ............... | 370/338 |
| 6,223,035 B1 | * | 4/2001 | Pierce et al. ................ | 455/433 |
| 6,226,279 B1 | * | 5/2001 | Hansson et al. ............. | 370/329 |
| 6,246,875 B1 | * | 6/2001 | Seazholtz et al. ........... | 455/432 |
| 6,295,457 B1 | * | 9/2001 | Narayanaswamy ......... | 455/466 |
| 6,304,753 B1 | * | 10/2001 | Hartmaier .................. | 455/413 |

FOREIGN PATENT DOCUMENTS

| | | | | |
|---|---|---|---|---|
| EP | 0801513 A1 | | 10/1997 | |
| GB | 0801513 A1 | * | 8/1997 | ...................... 11/4 |
| WO | WO 95/13685 | * | 11/1993 | ...................... 7/22 |
| WO | WO95/13685 | | 5/1995 | |

OTHER PUBLICATIONS

International Search Report, Date of Mailing, Nov. 12, 1999.

* cited by examiner

Primary Examiner—Thanh Cong Le
Assistant Examiner—Stephen D'Agosta (57) ABSTRACT

The invention relates to a wireless communication system for speech and packet data communication wherein deployment, control and maintenance of packet data functions becomes simpler and less costly. The wireless communication system (111) comprises one or more mobile switching centres (113) having group switches (115). Radio base stations (127) having transceivers programmed with software for handling packet data operation are connected to the mobile switching centre(s) (113). The wireless communication system (111) comprises also a packet data backbone (117), which is connected to the group switch(es) (115) of the mobile switching centre(s) (113). One or more centralised mobile data devices (131) are connected to the group switch(es) (115) of the mobile switching centre(s) (113). The centralised mobile data device(s) (131) is/are arranged for controlling packet data functions of radio base stations (127) having transceivers with packet data software via the group switch(es) (115) of the mobile switching centre(s) (113).

17 Claims, 5 Drawing Sheets

ARRANGEMENT RELATING TO TELECOMMUNICATION

TECHNICAL FIELD OF THE INVENTION

The present invention relates in general to the field of telecommunication, and more specifically to the field of wireless telecommunication.

BACKGROUND

Conventional public land mobile telephone networks (PLMN)—i.e. cellular radio telephone systems—include a land system and one or more mobile stations (MS). The land system typically includes at least one mobile switching centre, which is connected to one or more radio base stations (RBS). Normally, one or more of the mobile switching centres are also connected to a public switched telephone network (PSTN), i.e. a normal (non-mobile) telephone system. Each radio base station serves at least one geographical area known as a cell. Mobile stations that are positioned in the cell(s) communicate with the radio base station via a radio interface. The mobile stations communicate, via the radio base stations and the mobile switching centres, with other mobile stations in the PLMN or with telephones connected to the PSTN.

Most PLMN systems used today were originally designed for speech communication. The switching technology used in the PLMN system is therefore typically so called circuit switching, which is also used in the conventional PSTN. This means that there is a dedicated two-way connection set up between two of the mobile stations (or between one of the mobile stations and one fixed telephone in the PSTN) continuously for the whole duration of a call, even if no information (e.g. speech) is in fact transferred. Circuit switching is suitable for applications having need for continuous flows of information, which are delay sensitive but not bit error sensitive, e.g. speech and video communication.

Today, however, there is an increasing interest in data communication, e.g. electronic mail, internet, file transfers and the like. For many forms of data communication circuit switching is, however, not the optimal solution. Packet switching is an alternative form of switching, which is often more suited for data communication. The information, that is to be transferred through a packet data network employing packet switching, is divided into packets, which need not be of equal length. Each data packet contains an address indicating its destination. When the data packet reaches a node of the packet data network, it enters a buffer. Typically, the packet is then checked for bit errors, e.g. by means of cyclic redundancy check (CRC), that might have occurred during transmission, and a retransmission is requested if bit errors are detected. The error checking and the retransmission do, however, cause delays in the transferring of information. If no bit errors are detected, the address of the packet is read and the packet is forwarded to a next node. This is repeated until the packet reaches its destination. At the destination the packets are collected, and the original information is assembled from the packets. In packet switching there is no dedicated connection (channel) for each user. The transfer of information requires only as much (or little) of the channel resources (e.g. bandwidth or time) as is necessary. Packet switching is normally not suited for speech and video communication, due to the delays involved, but is highly suited for most forms of data communications, thanks to the high accuracy that results from error checking and retransmission.

Wireless packet data networks have also been designed. The wireless packet data networks are normally constructed as overlay systems on the existing PLMN, e.g. CDPD (Cellular Digital Packet Data) for AMPS and D-AMPS systems. The land system is then complemented with a Packet Data Backbone Network (PDBN) to which the mobile switching centres of the PLMN are connected. The packet data backbone network comprises one or more Packet Data Intermediate Systems (PDIS) which, among other things, perform the packet switching within the land system. The PDBN is also connected to one or more fixed end systems, e.g. internet, intranets or a computer (e.g. a PC).

The packet data communication between one of the mobile stations and one of the base stations takes place on a radio channel comprising an uplink carrier and a downlink carrier, which have been reserved for packet data communication. The mobile station sends packets of data to the radio base station on the uplink carrier and receives packets of data from the radio base station on the downlink carrier. The mobile station also receives control messages from the radio base station on the downlink carrier, informing the mobile station on when it shall send data packets on the uplink carrier or receive data on the downlink carrier. This means that the same uplink carrier and downlink carrier can be shared by several of the mobile stations for packet data communication.

In order for the radio base stations to handle packet data, they must, however, be modified with new hardware as well as with new software. One known solution is an integrated solution in which a mobile data device (MDD) is installed in the radio base station, and transceivers in the radio base station are provided with new software, allowing them to handle packet data. The MDD is, among other things, arranged for providing control of packet data functions in the transceivers and for enabling packet data communication between the radio base station and the packet data backbone via the mobile switching centre. Another known solution is an overlay solution with an external packet data base station unit, which is connected to the radio base station. The external packet data base station unit is arranged for using the existing antenna functions of the radio base station, although having its own transceiver(s) and its own MDD. The external packet data base station unit is normally connected to a channel serving unit (CSU), which is arranged for inserting and dropping the transferred information into/from time slots on the Pulse Code Modulation (PCM) link connection between the radio base station and the mobile switching centre.

However, with the above solutions, the full deployment of packet data coverage in the public land mobile telephone network becomes costly and requires a lot of engineering work, since each and every one of the radio base stations has to be individually modified with new hardware as well as with new software.

SUMMARY OF THE INVENTION

The present invention addresses the problem of obtaining a wireless communication system for speech and packet data communication wherein deployment, control and maintenance of packet data functions becomes simpler and less costly.

The above stated problem is solved in short with a wireless communication system according to the following. The wireless communication system comprises one or more mobile switching centres having group switches. Radio base stations having transceivers programmed with software for handling packet data operation are connected to the mobile switching centre(s). The wireless communication system comprises also a packet data backbone, which is connected to the group switch(es) of the mobile switching centre(s). One or more centralised mobile data devices are connected to the group switch(es) of the mobile switching centre(s). The centralised mobile data device(s) is/are arranged for controlling packet data functions of radio base stations having transceivers with packet data software via the group switch(es) of the mobile switching centre(s).

The object of the invention is thus to obtain a wireless communication system for speech and packet data communication, wherein deployment, control and maintenance of packet data functions becomes simpler and less costly, and the invention comprises such a wireless communication system.

The way in which the present invention solves the above stated problem can be explained in somewhat more detail according to the following. Deployment of packet data functions is done by installing software for packet data communication in the transceivers and, if needed, by adding processing capacity to the central mobile data device(s). There is no need for visiting a radio base station site for deployment of packet data functions, since no hardware reconfiguration of the radio base stations is needed and since software for packet data communication can be installed in the transceivers remotely from the mobile switching centre(s). Deployment of packet data functions thus becomes simpler and less costly. It is also easy to reallocate packet data resources between cells depending on varying demand for packet data communication in the cells, this further adding to flexibility and efficiency in use of system resources, leading in the end to an increase in overall cost efficiency. The control of packet data functions becomes simpler and less costly, since the control of packet data functions of a plurality of radio base stations can be done by one centralised mobile data device, instead of having one mobile data device installed in each of the radio base stations. Maintenance work also becomes simpler and less costly, since there is no need to visit the individual radio base stations in order to perform maintenance work relating to packet data functions.

PREFERRED EMBODIMENTS

Figure 1:
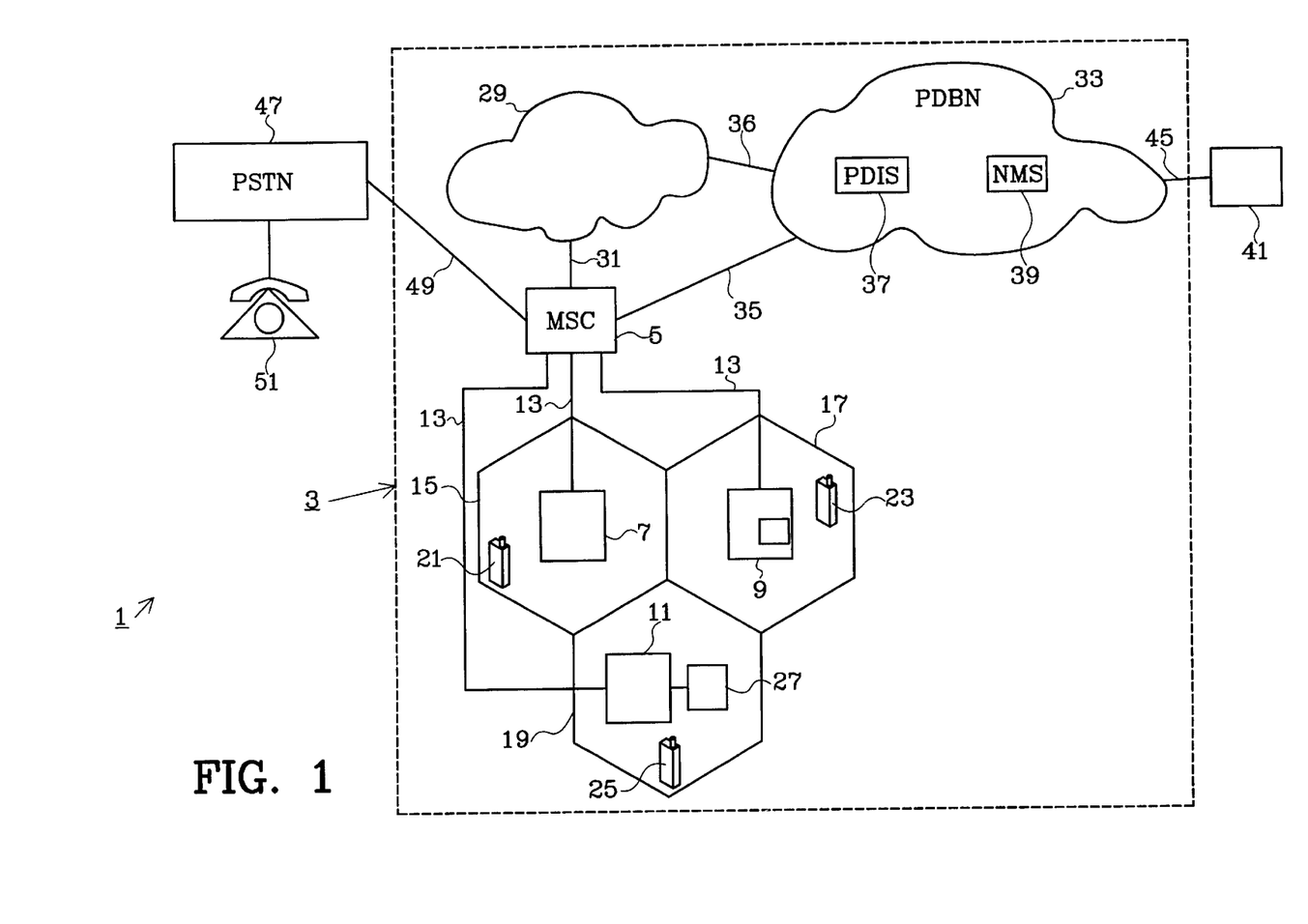
FIG. 1 is a block diagram of a telecommunication system according to what is previously known.

In FIG. 1 is shown, as an example, a block diagram of a telecommunication system 1 according to what is previously known.

The telecommunication system 1 of FIG. 1 comprises a wireless communication system 3. The wireless communication system 3 comprises a first MSC 5. The first MSC 5 is connected to a first, a second and a third RBS 7, 9 and 11 by means of PCM link connections 13. The first RBS 7 serves a first cell 15 in which a first MS 21 is located. Likewise, the second RBS 9 and the third RBS 11 serve a second cell 17 and a third cell 19, respectively. A second MS 23 is located in the second cell 17, and a third MS 25 is located in the third cell 19. The first RBS 7 is arranged for providing wireless speech communication in the first cell 15. The second and the third RBS 9 and 11 are, however, in this example arranged in two different previously known ways for providing (wireless) packet data communication as well as speech communication in the second and the third cell 17 and 19. The second RBS 9 is configured as an integrated solution RBS and the third RBS 11 is, on the other hand, configured as an overlay solution RBS, having an external Mobile Data Base Station 27 (MDBS) connected to it.

The wireless communication system 3 in FIG. 1 comprises further mobile switching centres, which in turn are connected to further radio base stations serving corresponding cells having further mobile stations located therein. However, for simplicity, these further parts of the system are not shown explicitly in FIG. 1, but are just indicated schematically by a block 29. The first MSC 5 is thus connected to the further mobile switching centres, as is indicated schematically in FIG. 1 by means of a first line connection 31 connecting the first MSC with the block 29. The first MSC 5 and the further mobile switching centres provide for circuit switching for speech communication within the wireless communication system 3, in a manner well known to a person skilled in the art.

The wireless communication system 3 in FIG. 1 also comprises a Packet Data Backbone Network (PDBN) 33. The PDBN 33 is connected to the first MSC 5 by means of a second line connection 35. The PDBN 33 is also connected to the further mobile switching centres, as is indicated schematically in FIG. 1 by means of a third line connection 36 connecting the PDBN 33 with the block 29. The PDBN 33 includes a Packet Data Intermediate System (PDIS) 37. The PDBN 33 also includes a Network Management System (NMS) 39 for controlling the operation of packet data communication within the wireless communication system 3.

The telecommunication system 1 of FIG. 1 also comprises a fixed end system 41, e.g. internet, intranet or one or more computers (e.g. PC), which is connected to the PDBN 33 by means of a connection 45.

The telecommunication system 1 of FIG. 1 comprises a PSTN 47, which is connected to the first MSC 5 by means of a fourth line connection 49. A first (fixed) telephone 51 is connected to the PSTN 47 as well as further telephones, not shown in FIG. 1.

The telecommunication system 1 of FIG. 1 is arranged, in ways well known to the skilled person, so that the first, the second and the third MS 21, 23 and 25 can be involved in speech communication with other units in the telecommunication system 1, e.g. other mobile stations in the wireless communication system 3 or the first telephone 51. The telecommunication system 1 is also arranged, in ways well known to the skilled person, so that the second and third MS 23 and 25 can be involved in packet data communication with other units in the telecommunication system 1, e.g. a personal computer connected to the PSTN 47 or to the fixed end system 41. The first MS 21 cannot, however, be involved in packet data communication as long as it is located in the first cell 15, since the first RBS 7 does not support packet data communication.

Figure 2:
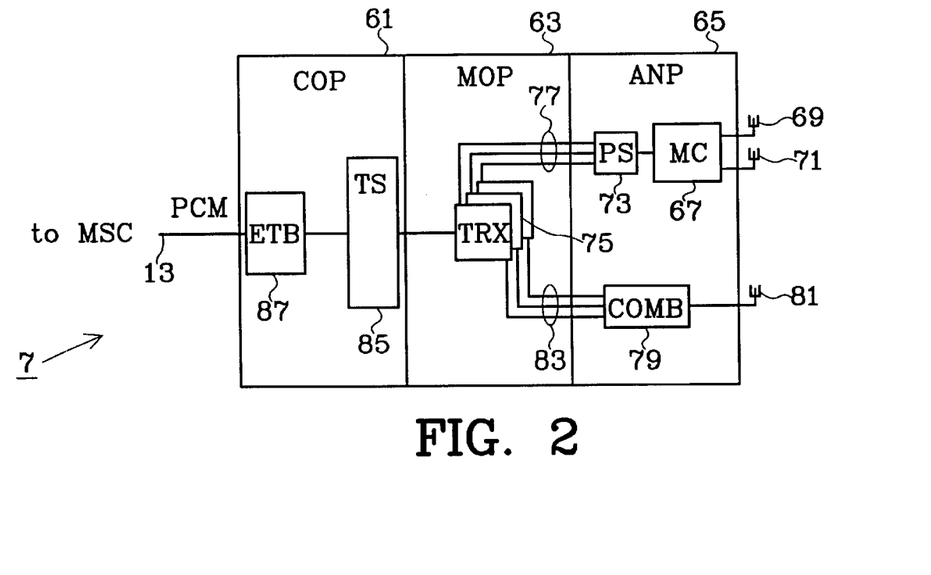
FIG. 2 is a block diagram showing in detail a first radio base station in the telecommunication system of FIG. 1.

FIG. 2 is a block diagram showing the first RBS 7 in more detail. The first RBS comprises three main parts: a control part (COP) 61, a modem part (MOP) 63 and an antenna near part (ANP) 65. The construction and function of these main parts are well known in the art and will be discussed just briefly for simplifying the understanding of the invention.

In FIG. 2, a multicoupler unit 67 is arranged in the ANP 65 of the first RBS 7. The multicoupler unit 67 is connected to a first and a second receiving antenna unit 69 and 71 respectively, which are arranged for receiving radio signals from the mobile stations in the wireless communication system 3. The first and second antenna unit 69 and 71 provide for diversity in the reception of the radio signals. A power splitter 73 in the ANP 65 is connected to the multicoupler unit 67. The power splitter splits the radio signals that are received through the first and second antenna unit 69 and 71 and the multicoupler unit 67 into several signals of equal strength, which are then transferred to a set of transceivers 75 in the MOP 63 via a first set of line connections 77. On the transmitting side, a combiner 79 is arranged in the ANP 65, the combiner 79 being connected to a transmitting antenna unit 81. The transmitting antenna unit 81 is arranged for sending radio signals to the mobile stations in the wireless communication system 3. The combiner 79 receives signals from the transceivers 75 via a second set of line connections 83. The transceivers 75 are also connected to a time switch (TS) 85 in the control part 61 of the first RBS 7. The time switch 85 is also connected to an Exchange Terminal Board 87 (ETB). The ETB 87 is connected to the PCM link connection 13 to the first MSC 5. The ETB 87 serves as a multiplexing/demultiplexing transmission interface towards the PCM link connection 13, allowing the first RBS 7 to communicate with other units of the telecommunication system 1 via the first MSC 5.

The first MS 21 in FIG. 1 can be involved in speech communication with, for example, the second MS 23 which sends information representing speech to the first MSC 5 via the second RBS 9. The first MSC 5 sends this information in time slots on the PCM link connection 13 connecting the first MSC 5 and the first RBS 7. The ETB 87 in the first RBS 7 processes incoming information from the PCM link connection 13, and the processed information is then distributed to the different transceivers 75 via the time switch 85. The transceivers 75 perform, among other things, channel coding and modulation of the signals coming from the time switch for transmission over the air interface. The coded and modulated signals from the transceivers 75 are then via the second set of line connections 83 combined and coupled to the transmitting antenna unit 81 by the combiner 79. Radio signals are then sent, on a downlink of a predetermined radio channel, from the antenna unit 81 to the first MS 21. The first MS 21 in turn transmits its own radio signals, carrying information representing speech, on a uplink of the predetermined radio channel. The radio signals from the first MS 21 are received by the first and second receiving antenna units 69 and 71 and are further transferred to one of the transceivers 75 via the multicoupler unit 67, the power splitter 73 and the first set of lines 77. The transceiver 75 performs demodulation and channel decoding of the signals from the first MS 21. The information from the first MS 21 is then transferred from the transceiver 75 to the PCM link connection 13 via the time switch 85 and the ETB 87. The ETB 87 is arranged for adopting the speech information from the transceivers 75 for transport in time slots on the PCM link connection 13 to the first MSC 5. The speech information is then transferred from the first MSC 5 to the second MS 23 via the second RBS 9.

Figure 3:
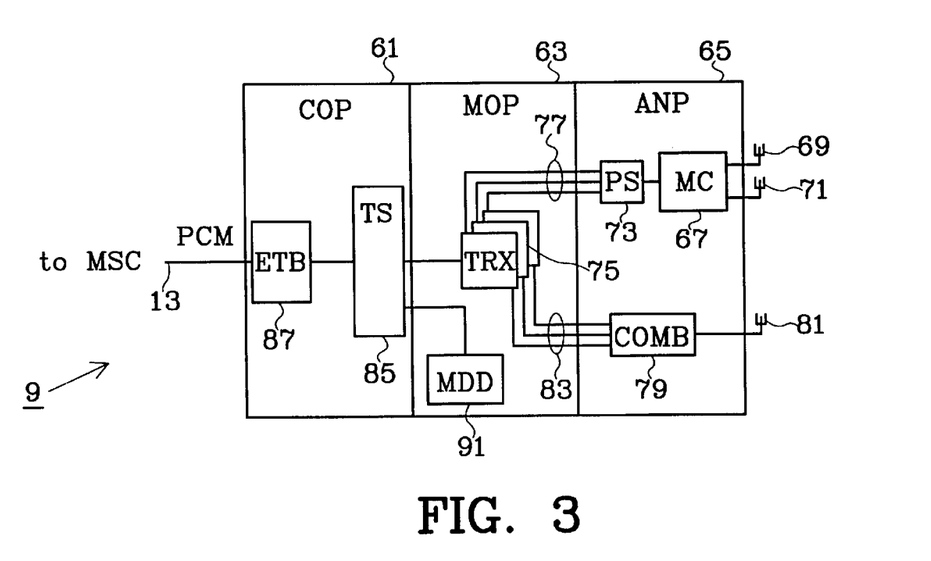
FIG. 3 is a block diagram showing in detail a second radio base station in the telecommunication system of FIG. 1.

FIG. 3 is a block diagram showing the second RBS 9 in more detail. The configuration and function of the second RBS 9 correspond largely to that of the first RBS 9. Only the differences between the second and first RBS 9 and 7 will therefore be discussed in more detail. The parts of the second RBS 9 that correspond to those of the first RBS 7 have, for simplicity, been given the same reference numerals as for the first RBS 7.

The second RBS comprises an MDD 91, which is located in the modem part 63 of the second RBS 9 and connected to the time switch 85 of the second RBS 9. Naturally, the MDD 91 can alternatively be located in other parts of the second RBS 9, or even outside the second RBS 9. The MDD 91, together with specific packet data software programmed into a predetermined number of the transceivers 75 of the second RBS 9, enable the second RBS 9 to provide for packet data communication between the second MS 23 and other units in the telecommunication system 1. With regard to packet data communication, the MDD 91 has several functions, as is well known in the art. The MDD 91 is arranged for relaying data frames between the PDIS 37 and the second MS 23 in the second cell 17. The MDD 91 is arranged for implementing various communication protocols to selected data in the data frames, the communication protocols providing conversion of the selected data into a format suitable for the air interface communication between the second RBS 9 and the second MS 23. The MDD 91 also controls the broadcasting of radio resource management information to the second MS 23, such as performance measurement messages and control messages for controlling the packet data communication over the air interface. The MDD is also arranged to act as an agent for remote management from the NMS 39 of the packet data operation of the second RBS 9.

It should be pointed out that the term mobile data device is well understood and commonly used in the art. It should also be pointed out that the term mobile data device does not refer to a physical device as such, but rather to a functional unit for performing tasks relating packet to data transfers. The physical implementation of the mobile data device is most commonly achieved by using boards of electronic circuitry known as mobile data boards. Each mobile data board is arranged, depending on its processing capabilities, for controlling the packet data functions of the transceivers loaded with packet data software.

Figure 4:
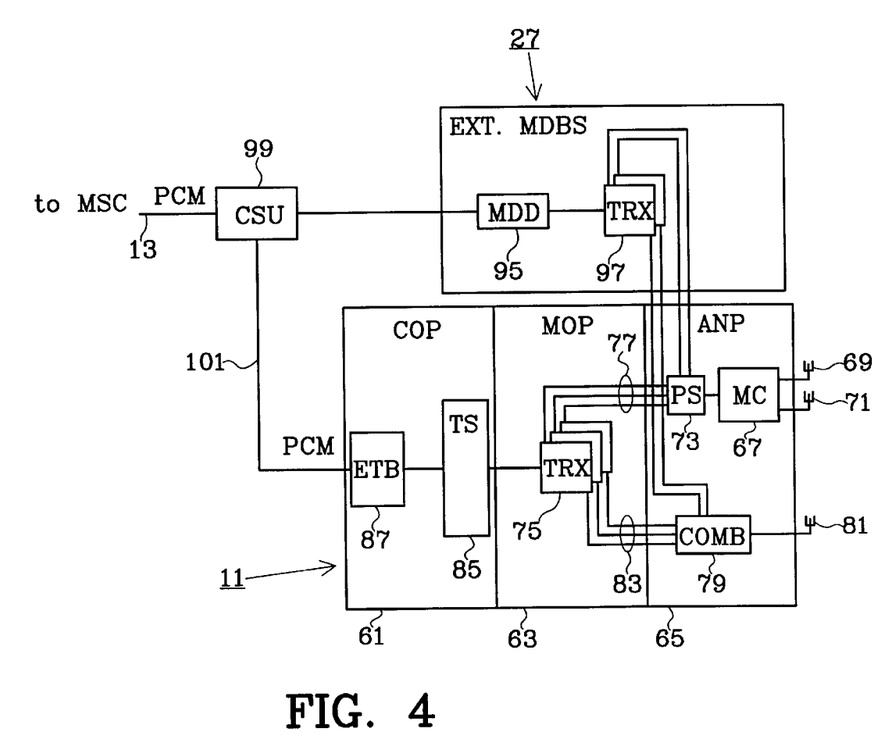
FIG. 4 is a block diagram showing in detail a third radio base station and an external mobile data base station in the telecommunication system of FIG. 1.

FIG. 4 is a block diagram showing the third RBS 11 and the external MDBS 27 in more detail. The construction of the third RBS 11 is identical to that of the first RBS 7. The operation of the third RBS 11 with regard to speech communication is therefore the same as that of the first RBS 7. The corresponding parts of the third RBS 11 have, for simplicity, been given the same reference numerals as for the first RBS 7. The external MDBS 27 comprises an MDD 95 and its own set of transceivers 97 that are programmed with specific software for packet data communication. The transceivers 97 of the external MDBS are connected to the MDD 95 of the external MDBS 27. The external MDBS 27 is, however, arranged for using the antenna equipment in the ANP of the third RBS 11. The transceivers 97 of the external MDBS 27 are therefore connected to the power splitter 73 of the third RBS 11 for reception of radio signals from the third MS 25, as well as to the combiner unit 79 of the third RBS 11 for transmission of radio signals to the third MS 25. The MDD 95 of the external MDBS 27 is also connected to a channel serving unit 99 (CSU). The CSU 99 is in turn connected via the PCM link connection 13 to the first MSC. The CSU 99 is also connected to the ETB 87 of the third RBS 11 by means of a secondary PCM link connection 101. The CSU 99 is arranged for inserting and dropping packet data information from/to the third MS 25 into/from time slots of the PCM link connection 13.

The MDD 95 of the external MDBS 27 is arranged for providing basically the same functions as the MDD 91 of the second RBS 9. However, the MDD 95 is arranged for operating the transceivers 97 of the external MDBS 27 dedicated for packet data and not the other transceivers 75 of the third RBS 11 dedicated for speech.

The wireless communication system of FIG. 1 has the disadvantage that the deployment of packet data functionality, in either of the configurations of the second RBS 9 or the third RBS 11 as described above, becomes costly and inflexible. Considerable configuration work is also required, since the radio base stations have to be individually configured with hardware (MDD, extra transceivers etc.) as well as with specific software for packet data communication. Maintenance of packet data functions also becomes complicated and time consuming, since maintenance personnel have to visit each and every one of the radio base stations in order to perform maintenance work on the MDDs. In some cells, there may also be long periods when packet data service is not required, meaning that packet data resources in the RBSs of those cells remain largely unused. On the other hand, if the demand for packet data service suddenly increases for one of the cells, there may be insufficient packet data resources installed in the radio base station serving that cell.

Figure 5:
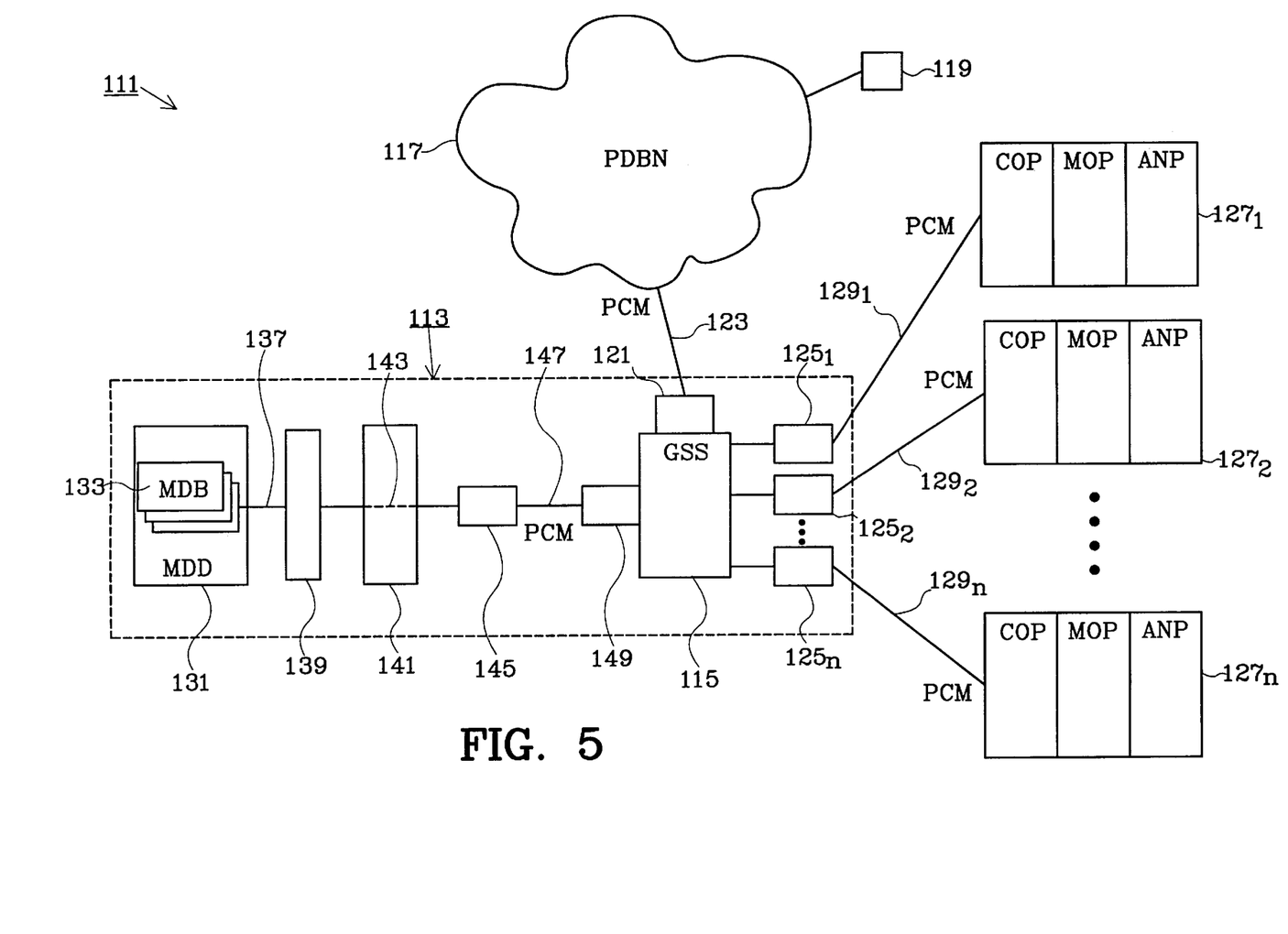
FIG. 5 is a block diagram showing, as an example according to the present invention, a wireless communication system for speech and packet data communication.

In FIG. 5 is shown in a block diagram, as an exemplary embodiment of the present invention, a wireless communication system 111. The system 111 of FIG. 5 is arranged to provide for communication of speech as well as packet data, the packet data communication functions being an overlay solution on a conventional PLMN. The wireless communication system 111 of FIG. 5 is, however, arranged so that deployment and maintenance of packet data functions are simplified and less costly. The wireless communication system 111 of FIG. 5 comprises an MSC 113 having a group switch 115. The wireless communication system 111 comprises also a PDBN 117, which is connected to a fixed end system 119. A first transmission interface unit 121, e.g. an exchange terminal card (ETC), is connected to the group switch 115. A first PCM link connection 123 connects the first transmission interface unit 121 with the PDBN 117. The first transmission interface unit 121 is arranged for performing functions that are needed for connecting the group switch 115 to the first PCM link connection, e.g. multiplexing, demultiplexing and conversion of information signals between different formats.

The group switch 115 is also connected to a set of (n) further transmission interface units $125_1, 125_2, \ldots, 125_n$, e.g. ETCs. The further transmission interface units $125_1, 125_2, \ldots, 125_n$ are in turn connected to a corresponding number (n) of radio base stations $127_1, 127_2, \ldots, 127_n$ by means of a set of (n) further PCM link connections $129_1, 129_2, \ldots, 129_n$. The radio base stations $127_1, 127_2, \ldots, 127_n$ in FIG. 5 are not shown in detail, but the internal configurations of these radio base stations $127_1, 127_2, \ldots, 127_n$ correspond, in this example, to the internal configuration of the first RBS 7 in FIG. 2. However, each of the radio base stations $127_1, 127_2, \ldots, 127_n$ in FIG. 5 includes a predetermined number of transceivers (not shown) programmed with specific packet data software, similar to the specific packet data software in the second RBS 9 in FIG. 3. The transceivers in the radio base stations $127_1, 127_2, \ldots, 127_n$ in FIG. 5 are designed for transmission/reception of radio signals using prevailing modulation/demodulation methods, e.g. FM (Frequency Modulation), π/4-DQPSK (Differential encoded Quadrature Phase Shift Keying) and GMSK (Gaussian Minimum Shift Keying), for different services, such as speech and packet data transfers. This allows the wireless communication system 111 of FIG. 5 to be an overlay solution on many PLMN systems in use today (e.g. AMPS/D-AMPS), since no hardware reconfiguration of the radio base stations will be required for deployment of packet data functions.

The radio base stations $127_1, 127_2, \ldots, 127_n$ in FIG. 5 do not have mobile data devices (MDD) installed in them. Instead, the packet data functions of the radio base stations $127_1, 127_2, \ldots, 127_n$ are controlled from a centralised MDD 131. The centralised MDD 131 includes a set of mobile data boards 133 and is, in this example, arranged in the MSC 113. The wireless communication system 111 of FIG. 5 comprises means for connecting the mobile data boards 133 (MDBS) in the centralised MDD 131 with the group switch 115. The mobile data boards 133 in the centralised MDD 131 are therefore, via the group switch 115, connected to the radio base stations $127_1, 127_2, \ldots, 127_n$ as well as to the PDBN 117 and can send/receive information signals to/from the radio base stations $127_1, 127_2, \ldots, 127_n$ as well as to/from the PDBN 117. The centralised MDD 131 is thus arranged for controlling the packet data functions of the radio base stations $127_1, 127_2, \ldots, 127_n$, via the group switch 115 from a location which, in this example, is separate from the radio base station $127_1, 127_2, \ldots, 127_n$.

The mobile data boards 133 in the centralised MDD 131 are, in this example, of a conventional type, being typically used in the prior art examples described in connection with FIG. 3 and FIG. 4. However, such conventional mobile data boards are primarily arranged for being installed as part of a RBS site. External interfaces of such conventional mobile data boards are therefore adapted to the requirements of the RBS site rather than to the requirements of the group switch 115 belonging to the MSC 113. However, the wireless communication system 111 of FIG. 5 comprises means for allowing the mobile data boards 133 in the centralised MDD unit 131 to be connected to the group switch 115 for exchange of information. The conventional mobile data boards, such as the mobile data boards discussed in connection with the prior art examples in FIG. 3 and FIG. 4, are normally arranged to communicate with transceivers via a communication link (CLINK) interface. The mobile data boards 133 in the centralised MDD 131 are therefore connected to CLINK cables 137, which in turn are connected to a radio transceiver terminal 139 (RTT). The RTT 139 includes a number of connectors (not shown) providing connection points with the CLINK cables 137. The RTT 139 is also connected to a second transmission interface unit 145, e.g. a exchange terminal board (ETB), by means of a semipermanent connection 143 provided by a time switch 141. The RTT 139 is arranged for transferring signals between time slots on the CLINK cables 137 and the time switch 141. The RTT 139 and the CLINK cables 137 constitutes a CLINK interface towards the mobile data boards 133 in the centralised MDD 131, as seen from the time switch 141. A Second PCM link connection 147 is connected to the second transmission interface unit 145 as well as to a third transmission interface unit 149 (e.g. a exchange terminal card), which in turn is connected to the group switch 115. The second transmission interface unit 145 is arranged for transferring signals between time slots on the second PCM link connection 147 and ports (not shown) in the time switch 141. The third transmission interface unit 149 is arranged for transferring signals between time slots on the second PCM link connection 147 and ports (not shown) in the group switch 115. The centralised MDD 131 is arranged for performing, via the group switch 115, the same functions, relating to packet data transfer, as the MDD 91 in FIG. 3.

Packet data information from the PDBN 117 is sent to the group switch 115 via the first PCM link connection 123 on one or more 64 kbit/second time slots (one time slot for each one of the mobile data boards 133). The packet data information on the 64 kbit/second time slots is extracted in the first transmission interface unit 121 and forwarded to the centralised MDD 131. The extracted 64 kbit/second time slots reaches the centralised MDD via: a semipermanent connection in the group switch 115, the third transmission interface unit 149, the second PCM link connection 147, the second transmission interface unit 145, the semipermanent connection 143 in the time switch 141, the RTT 139, and the CLINK cables 137 connecting the RTT 139 and the centralised MDD 131. The centralised MDD in turn communicates with each transceiver, loaded with special packet data software, in the radio base stations $127_1, 127_2, \ldots, 127_n$ via a 64 kbit/second time slot. These time slots are transferred to the transceivers via: the CLINK cables 137, the RTT 139, the semipermanent connection 143 in the time switch 141, the second transmission interface unit 145, the second PCM link connection 147, the third transmission interface unit 149, a semipermanent connection in the group switch 115 the set of further transmission interface units $125_1, 125_2, \ldots, 125_n$, the set of further PCM link connections $129_1, 129_2, \ldots, 129_n$, and the control parts of the radio base stations $127_1, 127_2, \ldots, 127_n$.

In an alternative embodiment, the wireless communication system 111 comprises also one or more further mobile switching centres in addition to the MSC 113. All further mobile switching centres have their own centralised MDDs connected to their group switches for controlling packet data functions of radio base stations that are connected to the further mobile switching centres. As an alternative, however, at least two of the mobile switching centres share the same centralised MDD for controlling packet data functions of their radio base stations.

The conventional mobile data boards 133 in the centralised MDD 131 are each designed to handle packet data functions of a predetermined number of transceivers (typically six), depending on processing power. A number of data boards 133, needed for the packet data operation of the radio base stations $127_1, 127_2, \ldots, 127_n$, are installed in the centralised MDD 131.

Figure 6:
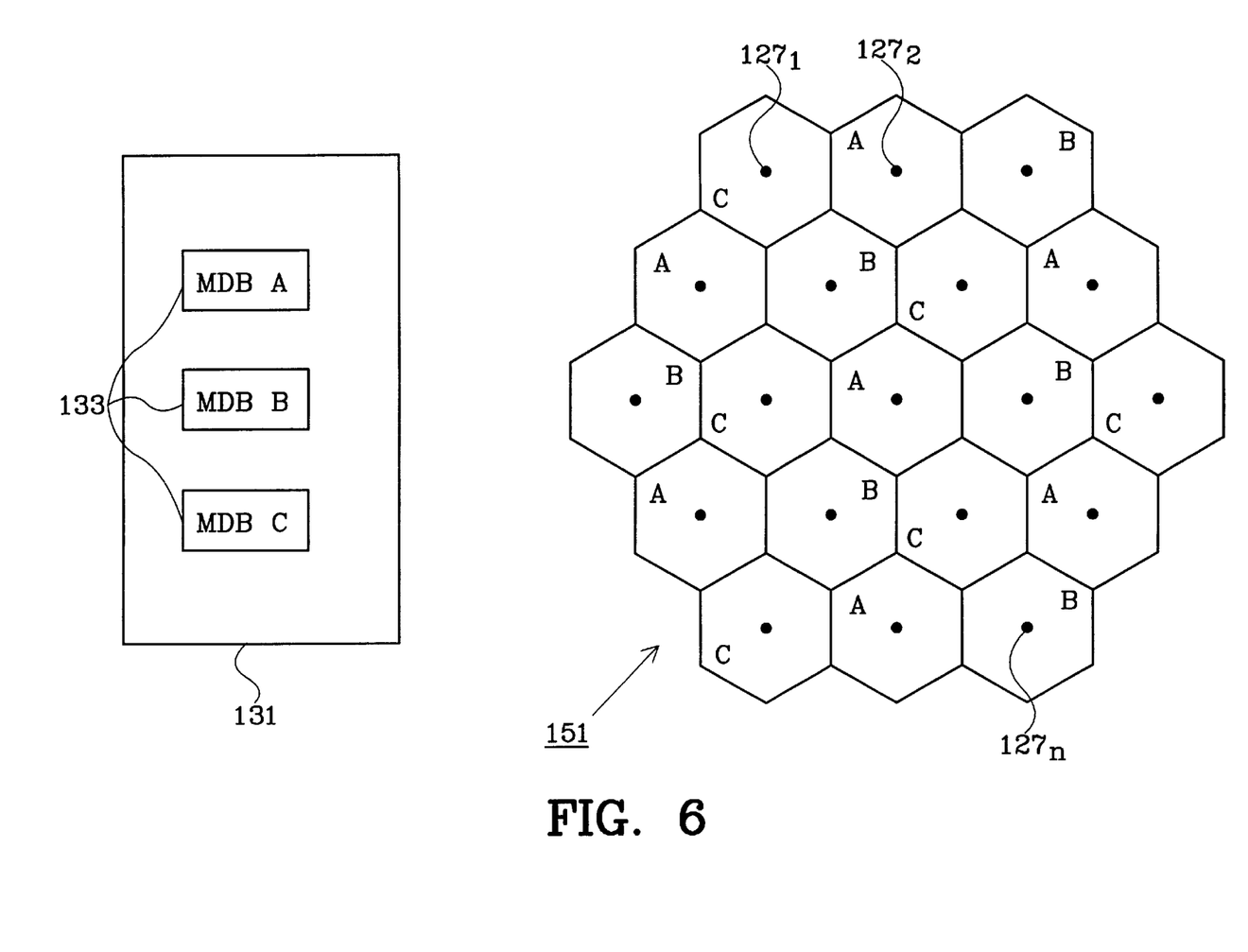
FIG. 6 is a block diagram showing selected parts of the wireless communication system of FIG. 6 for explaining how robustness and availability of packet data functions can be increased.

Each one of the mobile data boards 133 in the centralised MDD 131 is capable of controlling several transceivers having special packet data software. If one of the mobile data boards 133 becomes faulty, the packet data functions of the associated transceivers will be lost. However, in cellular systems, there is usually some overlapping coverage between neighbouring cells. Therefore, cells that have lost their packet data functions, due to faults in one of the mobile data boards 133, can to some extent be covered by neighbouring cells still having packet data functions intact. According to the invention, it is therefore suggested that each one of the mobile data boards 133 is arranged for controlling the packet data functions of transceivers associated with a selected subset of the cells that are covered by the radio base stations $127_1, 127_2, \ldots, 127_n$. It is also suggested that the cells belonging to each subset are distributed over a geographical area covered by radio base stations $127_1, 127_2, \ldots, 127_n$ in such a way that essentially no neighbouring cells are controlled by the same mobile data board 133. In FIG. 6, a block diagram is shown explaining this further. In FIG. 6, the centralised MDD 131 is shown having three mobile data boards 133, the mobile data boards 133 being marked as MDB A, MDB B and MDB C. FIG. 6 also shows the geographical area 151 covered by the cells (shown as hexagons) that are served by the radio base stations $127_1, 127_2, \ldots, 127_n$. The rest of the wireless communication system 111 is for the sake of simplicity not shown in FIG. 6. The cells (hereafter referred to as A-cells) where the packet data functions are controlled by the mobile data board MDB A are all marked with the letter A. Similarly, the cells (hereafter referred to as B-cells and C-cells) where the packet data functions are controlled by the mobile data boards MDB B and MDB C respectively are marked with the letters B and C respectively. The A-cells are distributed in the geographical area 151 so that they only have neighbouring cells that are either B- or C-cells. The B- and C-cells are similarly distributed so that the B-cells only have neighbouring cells that are either A- or C-cells and so that the C-cells only have neighbouring cells that are either A- or B-cells. A failure in, for example, the mobile data board MDB A will not result in a total loss of packet data functions in the A-cells, since the A-cells will be partially covered by the neighbouring B- and C-cells, which are not influenced by the failure in the mobile data board MDB A. The coverage of the B- and C-cells may even be enlarged by means of increased transmission output power. In this way, an MS can be reached even if it is located near the middle of an A-cell. Therefore, with the configuration of A-, B- and C-cells in FIG. 6, robustness and availability of packet data functions in the geographical area 151 will be increased.

An alternative way of increasing robustness and availability of packet data functions in the wireless communication system 111 is to arrange so that different transceivers, which are loaded with packet data software and arranged for serving the same cell, are controlled by different mobile data boards 133. Therefore, if one of the mobile data boards 133 becomes faulty, this will not lead to a total loss of packet data functions in a cell (provided of course that there is more than one transceiver dedicated for packet data transfers for that cell).

What is claimed is:

1. A wireless communication system for both speech and packet data communication, comprising:
   a plurality of radio base stations having at least one transceiver with software for packet data communication, wherein each of the radio base stations provides wireless communication services in at least one associated cell;
   a packet data backbone network; and
   at least one mobile switching center (MSC) in communication with the radio base stations and the packet data backbone network, said MSC including:
     a group switch connected to the packet data backbone network and to the radio base stations; and
     at least one centralized mobile data device connected to the group switch that remotely programs the software for selected transceivers in the radio base stations to provide packet data communications with mobile stations operating in associated cells.

2. The wireless communication system according to claim 1, wherein the means for connecting the mobile data device to the group switch includes:

a pulse code modulation (PCM) link connection;

means for connecting the group switch to the PCM link connection; and means for connecting the centralized mobile data device to the PCM link connection.

3. The wireless communication system according to claim 2, wherein the means for connecting the group switch to the PCM link connection includes a transmission interface unit that transfers signals between time slots on the PCM link connection and ports in the group switch.

4. The wireless communication system according to claim 2, wherein the means for connecting the centralized mobile data device to the PCM link connection includes:

means for connecting a time switch to the PCM link connection; and means for connecting the time switch to the mobile data device.

5. The wireless communication system according to claim 4, wherein the means for connecting the time switch to the PCM link connection includes a transmission interface unit that transfers signals between time slots on the PCM link connection and ports in the time switch.

6. The wireless communication according to claim 4, wherein the means for connecting the time switch to the centralized mobile data device includes:

a radio transceiver terminal connected to the time switch; and communication link cables connecting the mobile data device with the radio transceiver terminal, the radio transceiver terminal transferring signals between time slots on the communication link cables and the time switch.

7. The wireless communication system according to claim 1, wherein the centralized mobile data device includes at least one mobile data board, each one of the mobile data boards controlling packet data functions of a predetermined number of transceivers having software for packet data communication.

8. The wireless communication system according to claim 7, wherein the centralized mobile data device includes a plurality of mobile data boards, each one of the mobile data boards controlling the packet data functions of transceivers associated with a selected subset of the cells served by the radio base stations.

9. The wireless communication system according to claim 8, wherein the cells belonging to each one of the selected subsets are distributed so that neighboring cells belong to different selected subsets.

10. A wireless communication system comprising:

a first base station having a plurality of programmable transceivers;

a second base station having a plurality of programmable transceivers; and a switching center connected to the first and second base stations, said switching center including a mobile data device for remotely programming the programmable transceivers in the first and second base stations to provide packet data communications such that the first and second base stations provide packet data communication between the first or second base station and a mobile station, and wherein the mobile data device controls packet data functions in the transceivers of the first and second base stations.

11. The wireless communication system of claim 10, wherein the switching center further comprises a group switch connected to the programming means for controlling packet data functions of the first and second base stations.

12. The wireless communication system of claim 10, wherein the switching center includes a plurality of mobile data boards, and each one of the mobile data boards controls packet data functions of a predetermined number of the programmable transceivers in the first and second base stations.

13. The wireless communication system of claim 10, wherein the switching center includes a plurality of mobile data boards, and each of the mobile data boards controls packet data functions in a different one of the first and second base station.

14. The wireless communication system of claim 10, wherein the first and second base stations support both speech and packet data communication.

15. A wireless communication system comprising:

a first base station having a plurality of programmable transceivers;

a first switching center which serves the first base station;

a second base station having a plurality of programmable transceivers;

a second switching center which serves the second base station: and a mobile data device connected to the first and second switching centers, wherein the mobile data device remotely programs the programmable transceivers in the first and second base stations to provide packet data communications with mobile stations.

16. The wireless communication system of claim 15, wherein the mobile data device includes a plurality of mobile data boards, and each one of the mobile data boards controls packet data functions of a predetermined number of transceivers having software for packet data communication.

17. The wireless communication system of claim 15, wherein the first and second base stations support speech and packet data communication.

* * * * *